United States Patent
Ghiassi

(12) 
(10) Patent No.: US 8,845,895 B1
(45) Date of Patent: Sep. 30, 2014

(54) REUSABLE WATER BOTTLE WITH INTEGRATED DISPOSABLE CAP AND FILTER

(76) Inventor: Mohssen Ghiassi, Greenbrae, CA (US)

( * ) Notice: Subject to any disclaimer, the term of this patent is extended or adjusted under 35 U.S.C. 154(b) by 187 days.

(21) Appl. No.: 13/136,473

(22) Filed: Aug. 2, 2011

Related U.S. Application Data

(63) Continuation of application No. 13/134,164, filed on May 31, 2011, now abandoned.

(60) Provisional application No. 61/396,647, filed on Jun. 1, 2010, provisional application No. 61/460,448, filed on Jan. 3, 2011.

(51) Int. Cl.
  *B01D 35/30* (2006.01)
  *B01D 24/10* (2006.01)
  *B01D 27/02* (2006.01)
  *B01D 35/02* (2006.01)

(52) U.S. Cl.
  USPC ........... 210/232; 210/282; 210/429; 210/464; 210/466; 210/467; 210/468; 210/469; 210/474; 210/503; 210/505; 222/189.06; 222/189.1

(58) Field of Classification Search
  CPC .................................................. C02F 2307/02
  See application file for complete search history.

(56) References Cited

U.S. PATENT DOCUMENTS

| | | | | |
|---|---|---|---|---|
| 5,681,463 A * | 10/1997 | Shimizu et al. | ............... | 210/266 |
| 6,395,170 B1 * | 5/2002 | Hughes et al. | ................ | 210/232 |
| 6,838,005 B2 | 1/2005 | Tepper et al. | | |
| 7,473,362 B1 * | 1/2009 | Nohren, Jr. | ............... | 210/321.64 |
| 8,245,870 B2 * | 8/2012 | McKinney et al. | ........... | 220/375 |
| 2010/0230345 A1 * | 9/2010 | Chen | ............................. | 210/287 |

* cited by examiner

*Primary Examiner* — Benjamin Kurtz
(74) *Attorney, Agent, or Firm* — Reed Smith LLP

(57) ABSTRACT

A bottled water filtration system for use with a water bottle, the system having a bottle cap, a nozzle formed in a first side of the bottle cap, a porous filter housing formed on a second side of the bottle cap, and a filter material located inside the porous filter housing, wherein the cap, nozzle and filter housing are formed as an integrated unit, which can be attached and removed from a water bottle as a unit. The system is preferably used with a disposable plastic water bottle. Additionally, the system may include a rotatable counter for keeping track of the number of effective uses remaining in the filter system. Also, a one-way air valve may be included to prevent "backwash."

24 Claims, 9 Drawing Sheets

US 8,845,895 B1

REUSABLE WATER BOTTLE WITH INTEGRATED DISPOSABLE CAP AND FILTER

This application is a continuation of U.S. application Ser. No. 13/134,164, filed on May 31, 2011 now abandoned, which claims the benefit of U.S. Provisional Application No. 61/396,647, filed Jun. 1, 2010, entitled BOTTLED WATER AND FILTRATION SYSTEM; and U.S. Provisional Application No. 61/460,448, filed Jan. 3, 2011, entitled PERSONAL WATER FILTRATION SYSTEM, the disclosures of which are herein incorporated by reference.

BACKGROUND OF THE INVENTION

1. Field of the Invention

The present invention relates generally to water bottles, and more particularly to a disposable plastic water bottle having an integrated disposable cap and water filter, where the water bottle can be re-filled and re-used.

2. Description of the Related Art

Bottled water is gaining ever increasing popularity worldwide. Many negative consequences of this increase in popularity, however, are developing in the form of waste of fossil fuels and massive use of non-biodegradable plastics which are responsible for unsustainable environmental damage.

In response to this issue, many reusable water bottles have been introduced and are being sold worldwide. The reusable water bottles, however, have several drawbacks. These including rapidly warming and stale water, health issues related to long term use of the same plastic bottle, plastic odor, inconvenience of having to constantly carry the bottle and filling it from questionable tap waters, hygiene issues such as bacterial collection in nozzle and bottle interior, and finally, known harmful and potentially deadly agents such as BPA Bisphenol (BPA) found in inner coating of bottles.

SUMMARY OF THE INVENTION

The present invention is bottled water filtration system for use with a bottled water bottle. In one embodiment, the system includes a bottle cap, a nozzle formed in a first side of the bottle cap, a porous filter housing formed on a second side of the bottle cap, and a filter material located inside the porous filter housing, wherein the cap, nozzle and filter housing are formed as an integrated unit, which can be attached and removed from a water bottle as a unit. The system is preferably used with a disposable plastic bottled water bottle. Additionally, the system may include a rotatable counter for keeping track of the number of effective uses remaining in the filter system. Also, a one-way air valve may be included to prevent "backwash."

More particularly, according to one embodiment of the present invention, a disposable bottled water storage and filtration system, comprises a flexible plastic water bottle having a threaded opening, a bottle cap having threads to attach to the threaded opening of the water bottle, a nozzle formed in a first side of the bottle cap, a nozzle lid formed on the bottle cap, a porous filter housing formed on a second side of the bottle cap, the filter formed as a cylinder and comprising slots; a filter located inside the porous filter housing, and a rotating counter attached to the porous filter housing, wherein the cap, nozzle, nozzle lid, filter, filter housing and rotating counter are formed as an integrated unit, which can be attached and removed from the water bottle as a unit. The filter preferably comprises either a carbon-filled sachet or comprises nanoalumina fibers. Additionally, the filter housing may further comprise a one-way air valve.

BRIEF DESCRIPTION OF THE DRAWINGS

The present invention will be readily understood by the following detailed description in conjunction with the accompanying drawings, wherein like reference numerals designate like structural elements, and in which:

FIG. 7a illustrates a granulated carbon filter;

FIG. 7b illustrates a carbon filter;

FIG. 7c illustrates a pulverized or powdered carbon filter;

FIG. 7d illustrates a spun synthetic filter;

FIG. 7e illustrates a ceramic block filter;

FIG. 7f illustrates a pleated imbedded filtration paper;

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

The present invention is a disposable bottle of bottled water that is capable of reducing waste and thereby helps the environment by allowing the consumer to re-fill and re-use the same bottle twenty times or more. The water bottle incorporates a lightweight, disposable and inexpensive filtration system within the water bottle cap. As described in further detail below, the present invention can be implemented in various ways, as illustrated by the various embodiments.

In a preferred implementation, the system is sold as "bottled water." There are many types of water bottles on the market, but designing a system for use in pre-filled bottled water has certain challenges. Specifically, the design requires:

meeting FDA standards for a food product instead of EPA standards filter miniaturization so that the filter can fit in the cap of bottled water containers a filter which does not release a large volume of carbon particles into the water (so a buyer does not see carbon particles in the bottled water on the shelf)

a bottle design that works with high volume water filling machines a cap size that works with automatic capping machines The present invention addresses these issues and provides a disposable bottled water container with integrated filtration that can be sold along side other bottled water products, at a competitive price point.

Figures 1, 2:
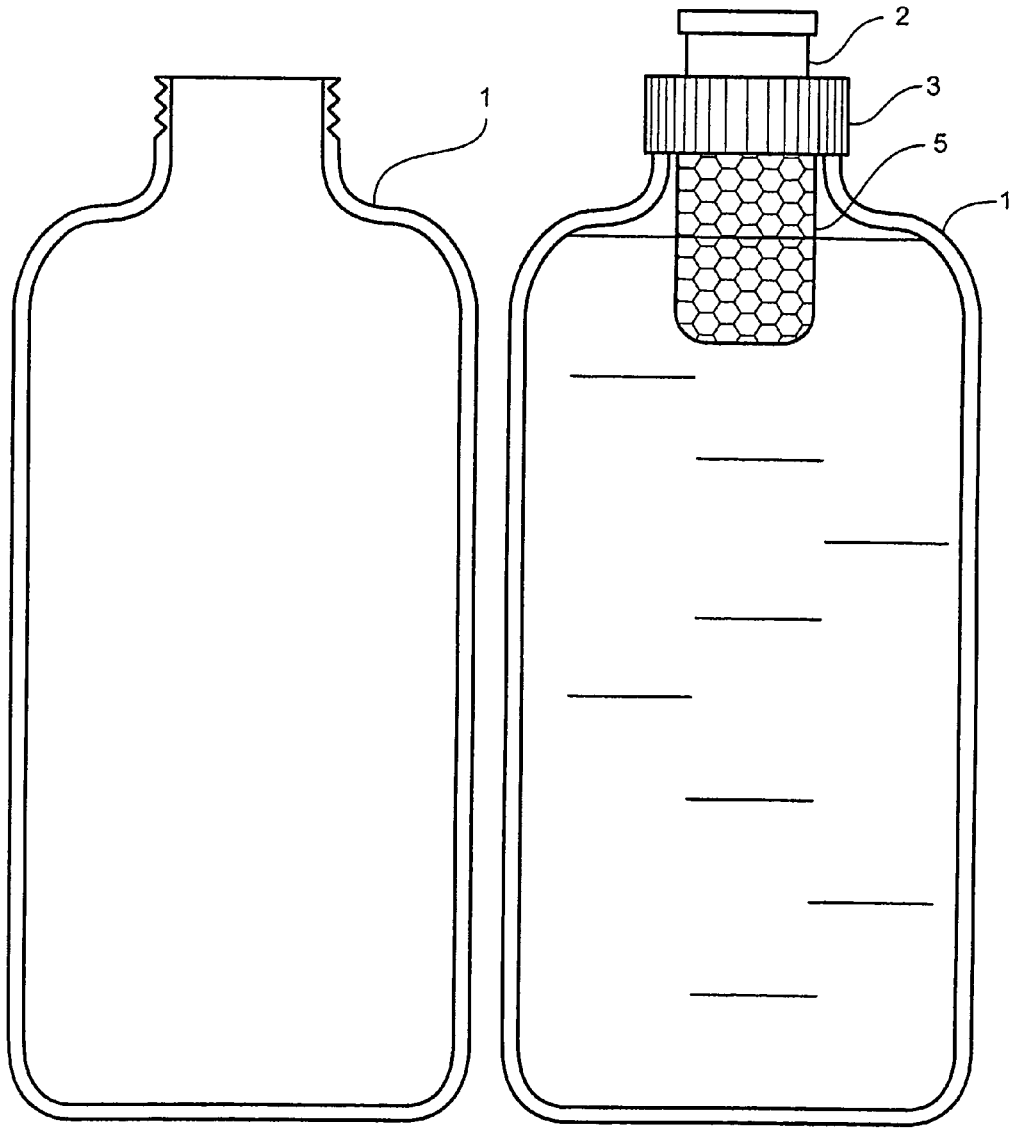
FIG. 1 illustrates a disposable plastic bottle suitable for use with the present invention.
FIG. 2 illustrates a first embodiment of the present invention of a disposable water bottle, and the integrated water filter.

FIG. 1 illustrates a standard disposable plastic water bottle 1 suitable for use in the present invention. In a preferred embodiment, the bottle 1 includes a threaded opening for attaching a bottle cap. As shown in FIG. 2, the bottle cap 3 incorporates a filter (not shown) in a filter housing 5. The filter housing 5 is formed with the cap 3, so that the cap and filter can be removed and re-attached to the bottle 1 as an integral unit. The cap 3 preferably includes threads for attaching the cap to the threaded opening of the water bottle 1.

In use, when the plastic bottle 1 is squeezed sufficient pressure is created that forces water through the filtration media located in the filter housing 5 and out of the opening at the top 2 of the bottle 1. When the bottle is empty, the cap 3 can simply be removed and the bottle re-filled with, for example, ordinary tap water. Since the bottle 1 incorporates its own filter system, the user can enjoy the benefits of filtered water, without disposing of the plastic water bottle 1 after just one use.

Figure 3:
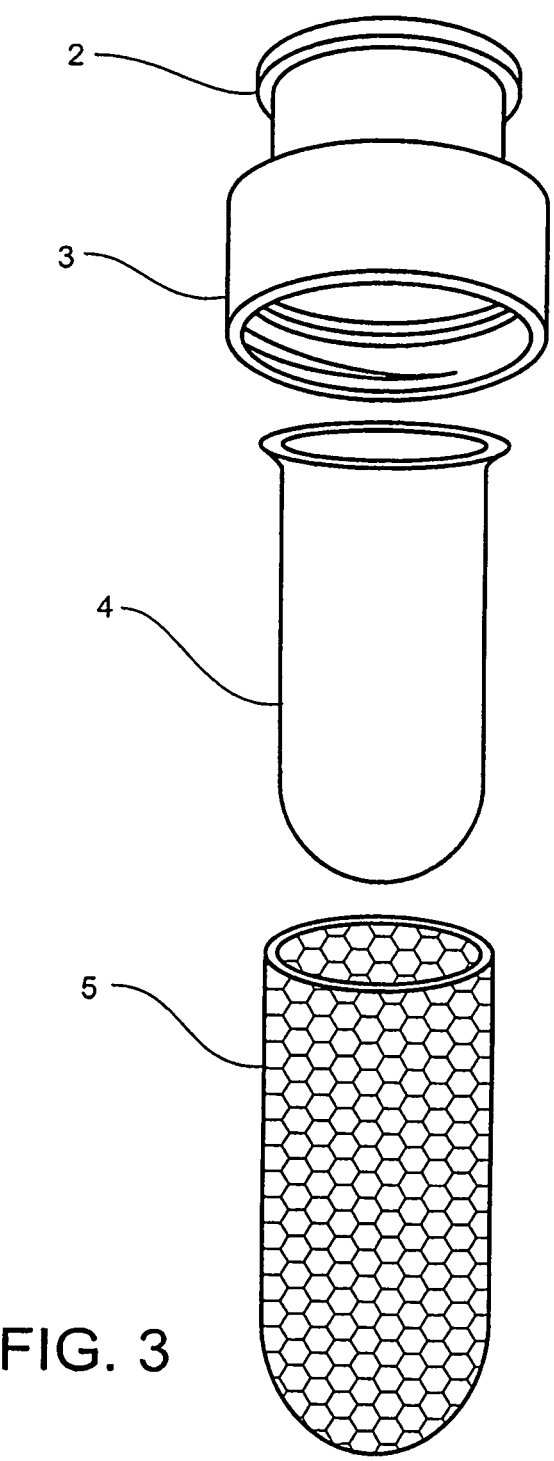
FIG. 3 is an exploded view of a water filtration system according to one embodiment of the present invention.
Figure 4:
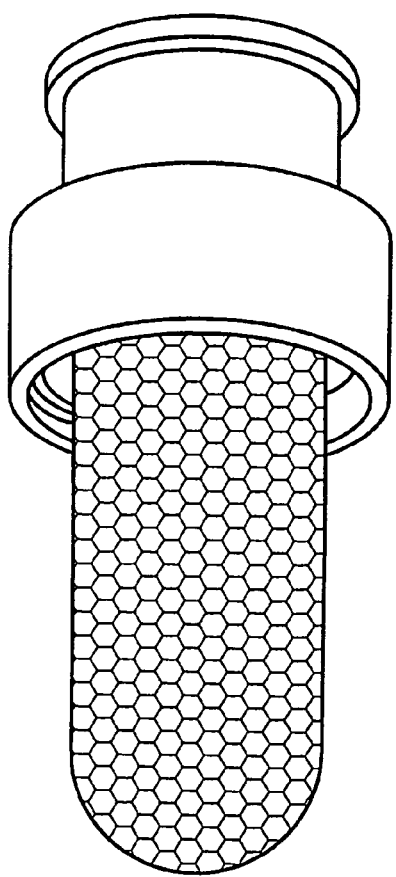
FIG. 4 is a side/bottom view of the water filtration system of FIG. 3.
Figure 5:
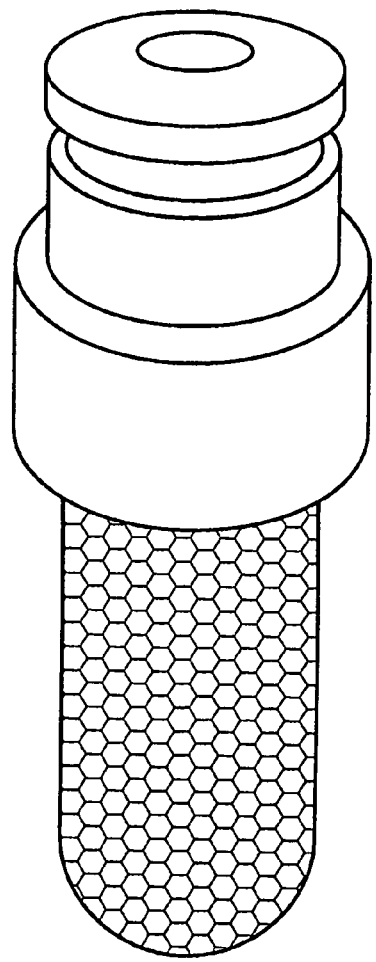
FIG. 5 is a side/top view of the water filtration system of FIG. 3.
Figure 6:
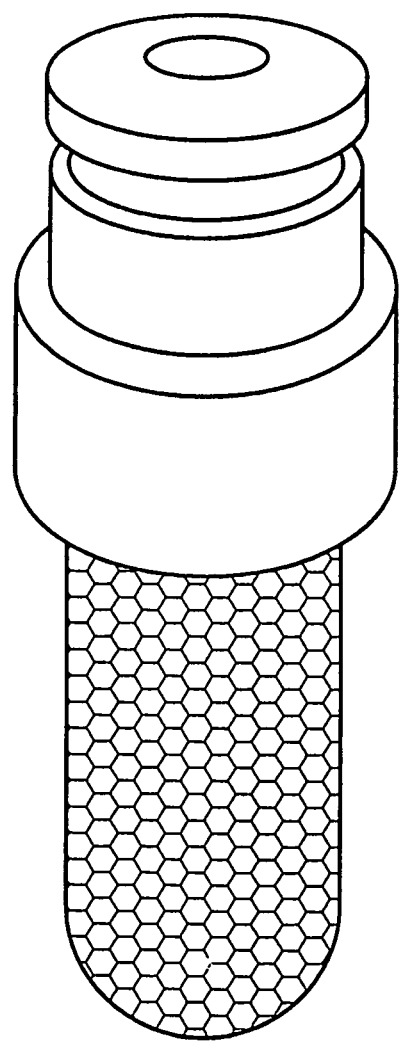
FIG. 6 illustrates the water filtration system of FIG. 3, with the cap in a water dispensing mode.

An embodiment of the filtration system is illustrated in FIG. 3. A porous filter housing or casing 5 encases a formed filtration material 4, which may include carbon particles to improve taste and reduce chlorine levels in the water. The filter system may be attached to the inside of the cap 3 of a water bottle with an optional retracting nozzle 2. The nozzle 2 may be engaged in the up position for dispensing (as shown in FIG. 6) or in a down or sealed position when not in use (as illustrated in FIGS. 4 and 5). The filter housing 5 and the cap 3 are combined and then attached and sealed onto the filled water bottle through the "capping" process commonly used by bottlers. The entire system, including bottle, cap and filtration system may be sold as one unit.

Figure 7:
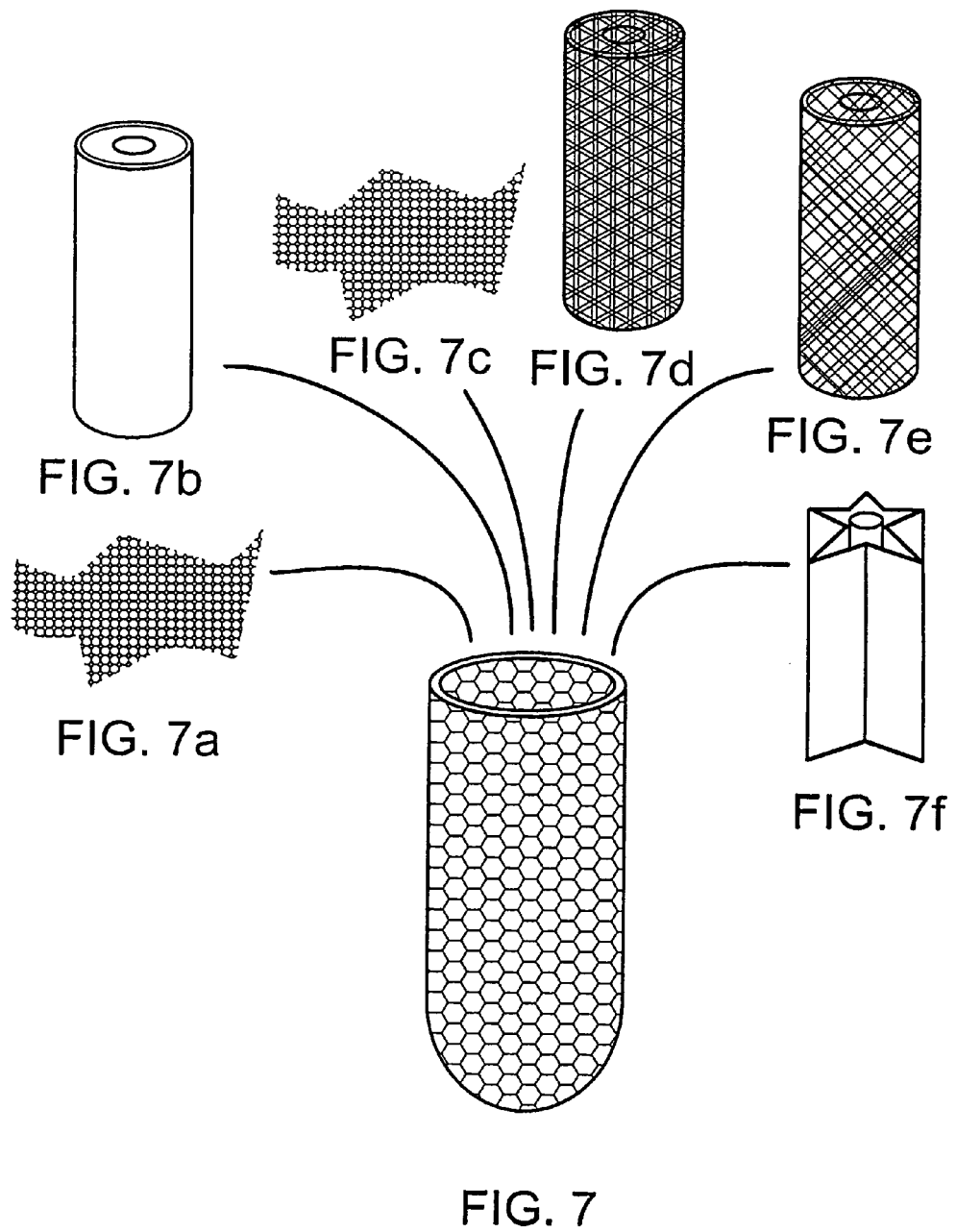
FIG. 7 illustrates the filter housing according to one embodiment of the present invention.

Optionally, different types of filtration material may be used for the actual filter. A filter housing according to an embodiment of the present invention is shown in FIG. 7. Various alternative filters are shown in FIGS. 7a-7e. For example, FIG. 7a illustrates a granulated carbon filter; FIG. 7b illustrates a carbon filter; FIG. 7c illustrates a pulverized or powdered carbon filter; FIG. 7d illustrates a spun synthetic filter; FIG. 7e illustrates a ceramic block filter; and FIG. 7f illustrates a pleated imbedded filtration paper. The filter material may also include zeolites, antimicrobial additives, nanoalumina, or combinations thereof. For example, the filter may be made using nanoalumina fibers as taught by U.S. Pat. No. 6,838,005, the disclosure of which is herein incorporated by reference. These materials provide various degrees of protection against a variety of harmful agents, metals, sediments and water borne diseases such as giardia, cryptosporidium, e-coli and others. The levels and materials of the filtration could vary in strength and performance depending on the local water conditions, wherever the bottled water may be sold.

Figure 8:
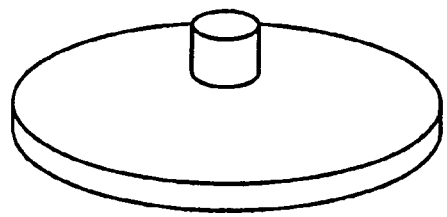
FIG. 8 illustrates a disc-shaped filter cartridge according to one embodiment of the present invention.
Figure 9:
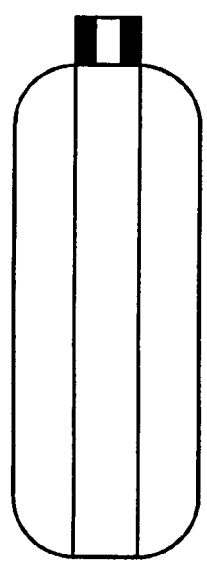
FIG. 9 illustrates a capsule-style cartridge according to one embodiment of the present invention.
Figure 10:
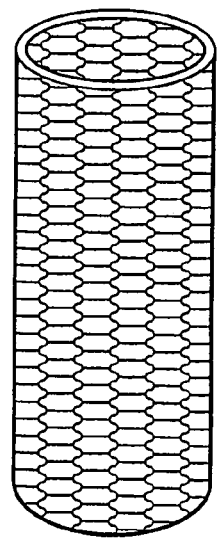
FIG. 10 illustrates a cylindrical filter housing having square pores.
Figure 11:
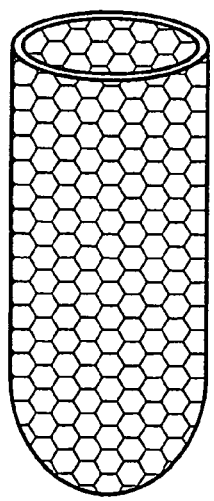
FIG. 11 illustrates a cylindrical filter housing having round pores.
Figure 12:
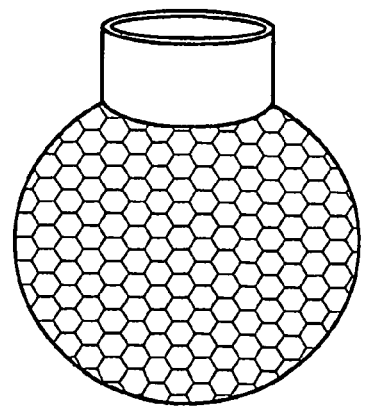
FIG. 12 illustrates a spherical-shaped filter housing.

In addition, the cartridge of the filtration system may also be made in variety of shapes and sizes depending on the container shape and size. For example, it may be disc-shaped (FIG. 8), capsule form (FIG. 9), cylindrical (FIGS. 10-11), or spherical (FIG. 12), or any other suitable shape or size. The size and shape of the pores in the housing may vary as well (see FIG. 10 vs. FIG. 11).

Figure 13:
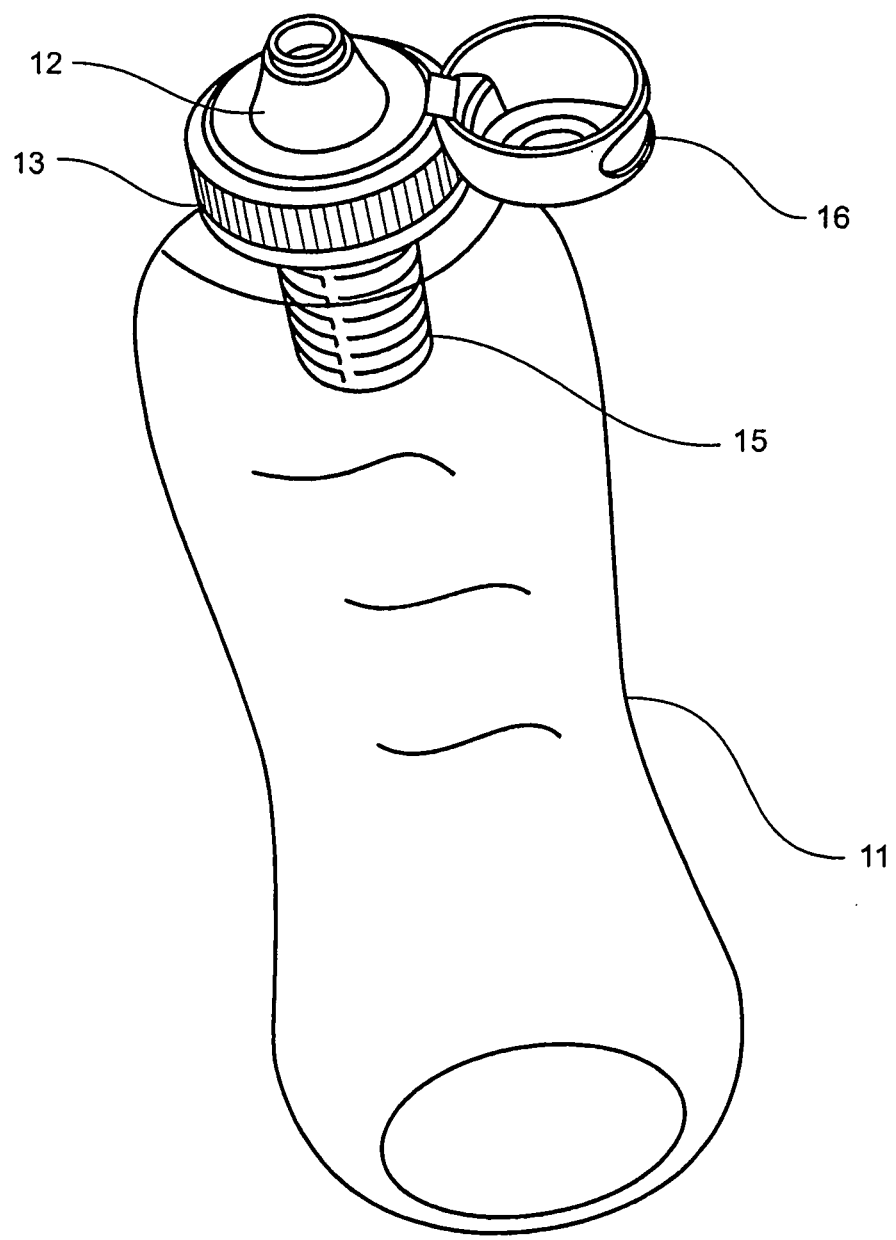
FIG. 13 illustrates an alternative water bottle and filtration system embodiment.
Figure 14:
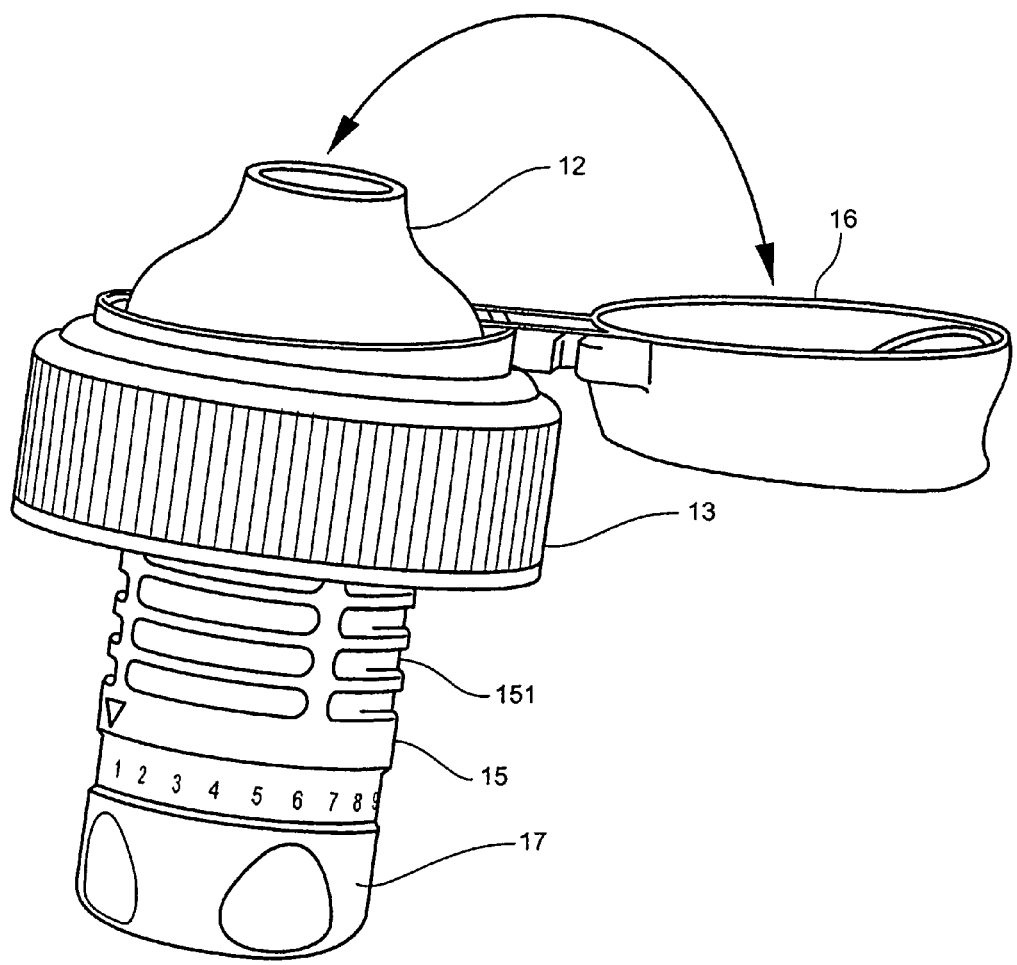
FIG. 14 is a detailed view of the alternative embodiment of FIG. 13.

An alternative embodiment of the present invention is illustrated in FIG. 13. A disposable water bottle 11 includes a cap 13, having an integrated filter (not shown) and filter housing 15. The cap includes a nozzle 12, and a nozzle cap 16. The operation of the system is similar to embodiment described above. FIG. 14 illustrates the cap 13 in further detail. The filter housing 15 is formed as a porous casing having elongated slots 151. To provide a convenient system for counting the number of effective filter re-uses, a rotating counter 17 may optionally be placed at the bottom of the filter casing 15. The user may advance the counter 17 with each re-fill in order to keep track of the number of uses remaining in the filtration system.

As noted previously with the prior embodiment, the water storage and filtration system of this embodiment is designed to be sold as a standard "bottled water" product, but one which can be re-filled and re-used many times.

Figure 15:
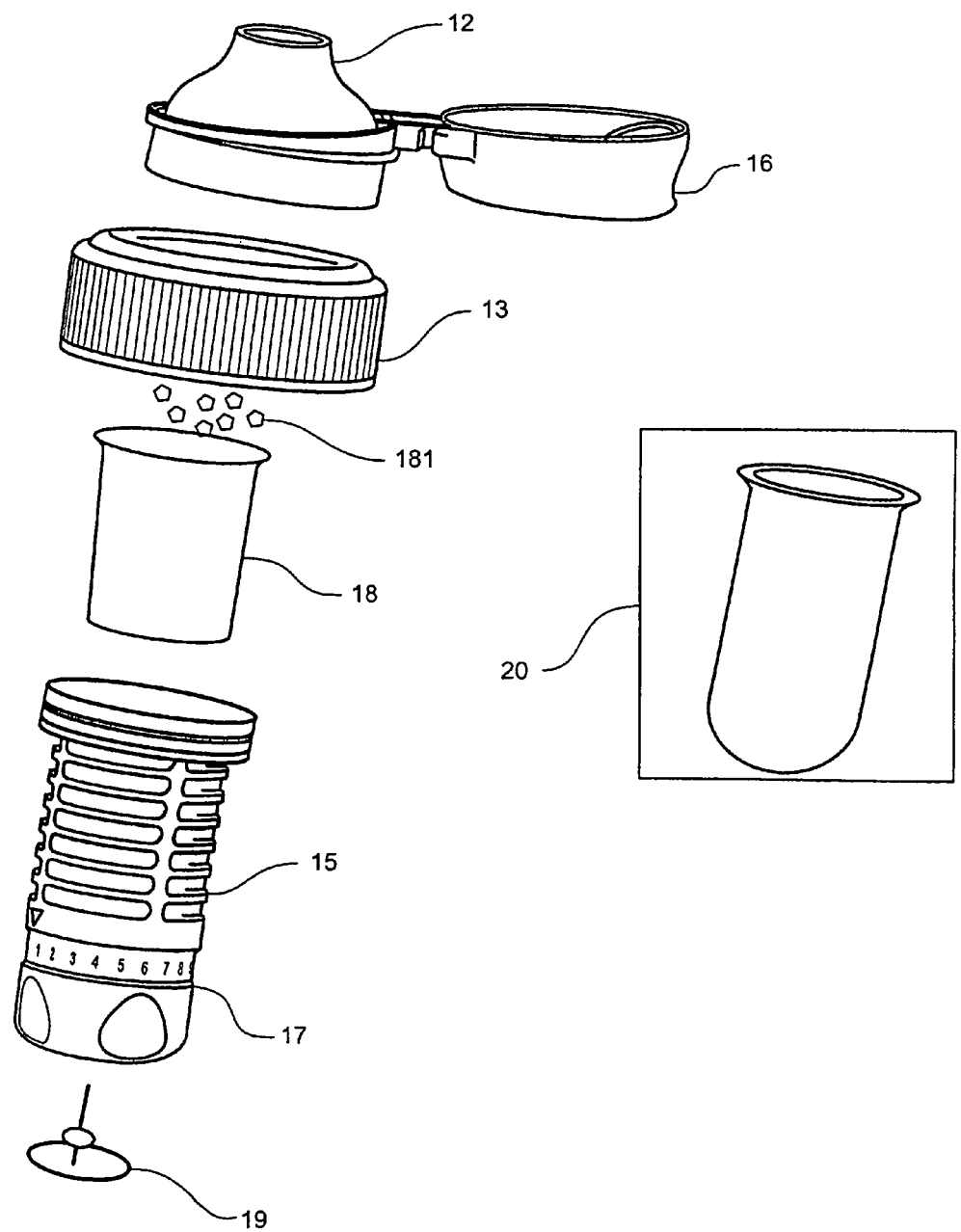
FIG. 15 is an exploded view of the cap and filter assembly of the embodiment of FIG. 13.

As shown in FIG. 15, the bottled water filtration cap includes a filtration media such as carbon blocks, carbon impregnated paper formed to fit the cartridge, carbon granules 181 or powder inside a sachet (sack) 18, pleated or spun filtration material or any other media generally used for water filtration, as described in detail above. In preferred implementations, the filter is either a carbon-filled sachet, or a formed "thimble-shaped" filter 20 formed with nanoalumina fibers as described above.

In operation, a backwash mix of water and saliva is generally created when drinking from a plastic disposable water bottle that uses a drinking nozzle. To further improve the sanitation of the present invention, an optional one way air valve 19 may be installed at the bottom of the filter cartridge 15. This one-way air valve forces the back wash created after drinking to travel back into the unfiltered water area, thereby, allowing it to be filtered again prior to drinking.

Those skilled in the art will appreciate that various adaptations and modifications of the just described preferred embodiments can be configured without departing from the scope and spirit of the invention. Therefore, it is to be understood to that, within the scope of the appended claims, the invention may be practiced other than as specifically described herein.

What is claimed is:

1. A water filtration system for use with a bottled water container, the system comprising:

a bottle cap;

a nozzle formed in a first side of the bottle cap;

a porous filter housing comprising a first end and a second end, wherein the first end of the porous filter housing attaches to a second side of the bottle cap; and a filter located inside the porous filter housing, wherein the filter comprises a sachet filled with carbon granules, the sachet having an extended lip on a first end, and;

wherein the cap, nozzle, filter housing, and filter form an integrated unit, which can be attached and removed from a water bottle as a unit.

2. The water filtration system of claim 1, wherein the filter housing is formed as a cylinder with a plurality of holes.

3. The water filtration system of claim 1, wherein the filter housing is formed as a cylinder having a plurality of slots.

4. The water filtration system of claim 1, wherein the filter housing further comprises a rotating counter.

5. The water filtration system of claim 1, wherein the filter housing further comprises a one-way air valve.

6. A disposable bottled water storage and filtration system, comprising:
- a plastic water bottle having a threaded opening;
- a bottle cap having threads to attach to the threaded opening of the water bottle;
- a nozzle formed in a first side of the bottle cap;
- a porous filter housing comprising a first end and a second end, wherein the first end of the porous filter housing attaches to a second side of the bottle cap; and
- a filter located inside the porous filter housing, wherein the filter consists of a sachet filled with carbon granules, the sachet having an extended lip on a first end;
- wherein the cap, nozzle, filter housing, and filter form an integrated unit, which can be attached and removed from the water bottle as a unit.

7. The bottled water storage and filtration system of claim 6, wherein the filter housing is formed as a cylinder with a plurality of holes.

8. The bottled water storage and filtration system of claim 6, wherein the filter housing is formed as a cylinder having a plurality of slots.

9. The bottled water storage and filtration system of claim 6, wherein the filter housing further comprises a rotating counter.

10. The bottled water storage and filtration system of claim 6, wherein the filter housing further comprises a one-way air valve.

11. A disposable bottled water storage and filtration system, comprising:
- a flexible plastic water bottle having a threaded opening;
- a bottle cap having threads to attach to the threaded opening of the water bottle;
- a nozzle formed in a first side of the bottle cap;
- a nozzle lid formed on top of the bottle cap;
- a porous filter housing comprising a first end and a second end, wherein the first end of the porous filter housing attaches to a second side of the bottle cap, the filter housing formed as a cylinder and comprising slots;
- a filter located inside the porous filter housing, wherein the filter comprises a sachet filled with carbon granules, the sachet having an extended lip on a first end; and
- a rotating counter attached to the porous filter housing
- wherein the cap, nozzle, nozzle lid, filter, filter housing and rotating counter form an integrated unit, which can be attached and removed from the water bottle as a unit.

12. The bottled water storage and filtration system of claim 11, wherein the filter housing further comprises a one-way air valve.

13. A water filtration system for use with a bottled water container, the system comprising:
- a bottle cap;
- a nozzle formed in a first side of the bottle cap;
- a porous filter housing comprising a first end and a second end, wherein the first end of the porous filter housing attaches to a second side of the bottle cap; and
- a filter located inside the porous filter housing, wherein the filter comprises a thimble-shaped filter formed with nanoalumina fibers having an extended lip on a first end; and
- wherein the cap, nozzle, filter housing, and filter form an integrated unit, which can be attached and removed from a water bottle as a unit.

14. The water filtration system of claim 13, wherein the filter housing is formed as a cylinder with a plurality of holes.

15. The water filtration system of claim 13, wherein the filter housing is formed as a cylinder having a plurality of slots.

16. The water filtration system of claim 13, wherein the filter housing further comprises a rotating counter.

17. The water filtration system of claim 13, wherein the filter housing further comprises a one-way air valve.

18. A disposable bottled water storage and filtration system, comprising:
- a plastic water bottle having a threaded opening;
- a bottle cap having threads to attach to the threaded opening of the water bottle;
- a nozzle formed in a first side of the bottle cap;
- a porous filter housing comprising a first end and a second end, wherein the first end of the porous filter housing attaches to a second side of the bottle cap; and
- a filter located inside the porous filter housing, wherein the filter comprises a thimble-shaped filter formed with nanoalumina fibers, the thimble-shaped filter having an extended lip on a first end;
- wherein the cap, nozzle, filter housing, and filter form an integrated unit, which can be attached and removed from the water bottle as a unit.

19. The bottled water storage and filtration system of claim 18, wherein the filter housing is formed as a cylinder with a plurality of holes.

20. The bottled water storage and filtration system of claim 18, wherein the filter housing is formed as a cylinder having a plurality of slots.

21. The bottled water storage and filtration system of claim 18, wherein the filter housing further comprises a rotating counter.

22. The bottled water storage and filtration system of claim 18, wherein the filter housing further comprises a one-way air valve.

23. A disposable bottled water storage and filtration system, comprising:
- a flexible plastic water bottle having a threaded opening;
- a bottle cap having threads to attach to the threaded opening of the water bottle;
- a nozzle formed in a first side of the bottle cap;
- a nozzle lid formed on the bottle cap;
- a porous filter housing comprising a first end and a second end, wherein the first end of the porous filter housing attaches to a second side of the bottle cap, the filter formed as a cylinder and comprising slots;
- a filter located inside the porous filter housing, wherein the filter comprises a thimble-shaped filter formed with nanoalumina fibers, the thimble-shaped filter having an extended lip on a first end; and
- a rotating counter attached to the porous filter housing;
- wherein the cap, nozzle, nozzle lid, filter, filter housing and rotating counter form an integrated unit, which can be attached and removed from the water bottle as a unit.

24. The bottled water storage and filtration system of claim 23, wherein the filter housing further comprises a one-way air valve.

* * * * *